Patented July 4, 1939

2,165,061

UNITED STATES PATENT OFFICE 2,165,061

METHOD OF PRODUCING ELEMENTS FOR DRY BATTERIES

Frank MacCallum, Birmingham, England, assignor to Maxolite Holdings Limited, Kingsway, London, England No Drawing. Original application July 8, 1936, Serial No. 89,524, now Patent No. 2,154,312, dated April 11, 1939. Divided and this application April 27, 1937, Serial No. 139,201. In Great Britain August 25, 1934

4 Claims. (Cl. 136—122)

This invention relates to methods of producing elements for dry batteries or to single cells and particularly concerns batteries or cells of the kind in which the or each cell comprises a pair of electrodes separated by an electrolyte and depolariser, the cells or cell elements being arranged sandwichwise, being a division of application Serial No. 89,524, filed July 8, 1936, now Patent No. 2,154,312, granted April 11, 1939.

The present invention is concerned with methods of producing a carbon zinc element of the kind including a zinc plate having on one surface a carbonaceous layer, the zinc plate forming the zinc electrode of one cell and contacting with the electrolyte membrane of that cell and the carbonaceous layer forming the carbon electrode of the adjacent cell and contacting with one surface of the depolariser block or tablet, the other surface of which contacts with the electrolyte membrane of that cell.

My experiments have shown that to obtain the best results where superposed elements are used (1) there should be intimate attachment between the carbon layer and the zinc plate, (2) the carbon shall contact with the plate over the entire surface of any desired area of the latter without possibility of lack of contact or poor contact at any part of the layer.

Good adhesive properties are accordingly required in the layer to be applied to the plate, but if a large proportion of adhesive is embodied in the carrier for the carbon layer, the conductivity is generally decreased and the efficient operation of the cell consequently reduced.

In addition, it is desirable that there should be good conductivity throughout the thickness of the carbon layer, and if more than one coating of particles is added, it is desirable that there should be good contact between the several coatings to ensure the desired conductivity throughout the thickness of the layer.

Further, it is desirable that the exposed surface of the carbon layer should be highly carbonaceous to promote good contact and conductivity between this surface and the remainder of the cell.

Further, a necessary requirement is that the carbon layer shall be liquid-proof throughout to prevent the possibility of penetration of liquids to the surface of the zinc plate causing undesirable local action. The carbon particles and the carrier therefore are preferably non-hygroscopic.

The object of the invention is to provide an improved method of producing a carbon zinc element for use in the construction of a dry cell or battery.

According to one aspect of this invention, the method includes the steps of mixing in a colloid mill suitable quantities of ammonia-resisting varnish and pure carbon the particles of which are of colloidal dimensions, and applying a coating of this mixture to one surface of a zinc plate.

By the expression "pure carbon" I mean a carbon black which is free from all impurities such as would materially increase its electrical resistance.

By "colloidal" I mean that the carbon is in a state of very fine sub-division approximating to the colloidal form.

The colloidal carbon may be in the form of acetylene soot, this being carbon black produced by incomplete combustion, as, for example, in the process of producing calcium carbide.

The preferred method of constructing a carbon zinc element according to the invention is set out in the following example:

24 grammes of acetylene soot are mixed in a colloid mill with a mixture of 7 ounces of ammonia-resisting varnish and 3 ounces of xylol spirit. (If colloidal graphite is used, a slightly less amount than 24 grammes is used.) The mixing is continued until the carbon particles become individually enclosed in the carrier or varnish, and each particle of the dry material is thereby separated by a coating of varnish.

It is advisable to mix the materials in a colloid mill because this has the effect of fining down the particles to the requisite degree, exposing it to the carrier or liquid, and finally obtaining as nearly as possible a complete suspension which is workable for painting, spraying or rolling.

One form of acetylene carbon black known as "Shawinigan Black" is obtained as a by-product in the manufacture of calcium carbide when limestone or similar material is passed over a coke furnace, the carbon black collecting in the flue. This carbon black has a specific gravity of approximately 1.89. This figure is the absolute specific gravity of the black when all air spaces are excluded.

A further suitable carbon, known as colloidal graphite, is produced by subjecting commercial graphite to a purifying treatment at a very high temperature, for example, in an electric furnace, the impurities being driven off and the graphite being obtained finally in a purified and finely divided state. This colloidal graphite has a density between 2.2 and 2.24, and when subjected to a pressure of about 150 pounds per square inch, its electrical resistance is approximately 0.02 ohm per cubic inch.

For the carrier or adhesive it is desirable to use a gum, a natural or artificial resin, varnish or other fluid, which combination of gum, resin, varnish or other fluid must essentially resist the action of ammonia and other chemicals of the battery whilst still having the necessary adhesive property when applied.

I have found that one suitable material for use as a carrier or adhesive consists of a mixture of seven parts of ammonia-resisting varnish 1294/6, specific gravity 0.895 to 0.905 with three parts xylol spirit, obtainable from Arthur Holden & Sons Limited, of Birmingham, England.

The resultant product is a colloidal dispersion of the carbon in the carrier or varnish and is applied to the surface of the zinc plate by brushing, spraying, rolling or extruding either in a single coating or layer or in two or more thin coats or layers.

The coating or layer is allowed or caused to dry, and the resultant contraction of the carrier or varnish causes the carbon particles to penetrate the coating and draws them into effective contact in a manner which results in a layer or coating having an extremely good electrical conductivity.

In a modified form of the invention, in making the carbon zinc element, I may use the colloidal dispersion of carbon black in an adhesive or carrier as hereinbefore described in combination with carbon in the form of carbon or graphite particles.

The element may then be made in any manner hereinbefore described, and on the outer surface of the carbon element I then sprinkle small particles of graphite. This will increase the area of carbon which will slow down polarisation by reason of its greater area in contact with the depolariser, and will assist depolarisation.

The carbon may also be dispersed in a carrier having insufficient adhesive properties and a suitable adhesive may be added to the carbon and carrier dispersion.

I believe (though this theory forms no part of the invention) that the carbon particles, although in such a fine state of division are of angular or crystalline form, and that when the coating of carrier or varnish contracts, the angles or corners of the particles penetrate their individual coatings, and the particles are moved into electrical contact.

Preferably, the coating is contracted by natural drying without direct application of heat since the contraction then takes place naturally, and the resultant coating is more flexible and less liable to crack in use, whilst the danger of subjecting the coating to too high a temperature is avoided.

One object of applying the carbon and carrier to the zinc in a plurality of thin coats is to obtain a better or more even distribution of carbon through the thickness of the coat than could otherwise be obtained. If the fluid is loaded too heavily with carbon so as to ensure the pressure of carbon completely through the thickness of the coating, then it is found that under certain conditions the carbon coating is liable to crack and further, to lift from the zinc.

If more than one coating is applied, each is allowed or caused to dry prior to the application of the next or a further coating.

By using two or more thin coatings, (1) the presence of carbon throughout the thickness of the coating is assured, (2) a suitable carbonaceous surface is obtained on both faces or such portion thereof as it may be found necessary to use for the proper development of the electrochemical action; (3) even conductivity throughout is obtained, while (4) the possibility of the formation of a film of binding material on the surface is considerably reduced, and (5) the risk of a non-liquid-proof coating is avoided.

According to a further modification of the present invention, the surface of the zinc plate may be prepared for receiving the coating of carbon either by subjecting it to a degreasing process or by sandblasting it. As an alternative, I may spray, brush or roll on to the plate a weak solution of the carbon and a gum containing or consisting of methylated spirit and lac, the solvent is the carrier not affecting the lac varnish sufficiently rapidly to render the latter unstable during the application of the second coat.

Carbon zinc elements constructed in accordance with the present invention enable the construction of cells or batteries having the following properties:

(1) Low internal resistance.
(2) Evenness of polarisation.
(3) Due to the plurality of superimposed coats of carbon and carrier, small danger of liquid penetration.
(4) Saving of space and material and other advantages consequent on the use of thin coats of carbon and carrier.
(5) Toughness in the coating of carbon and carrier.
(6) Sufficient flexibility in the coating to avoid cracking or lifting, and to accommodate distortions of plate.
(7) Sufficient mechanical strength in the coating to withstand handling or use.
(8) A suitable surface for attachment to the depolariser.
(9) Danger of deterioration is substantially eliminated, permitting the elements to be produced in the slack season and stored without reduction in efficiency.

What I claim then is:

1. A method of producing a carbon zinc element for use in the construction of a dry cell or battery, including the steps of mixing in a colloid mill suitable quantities of ammonia-resisting adhesive varnish which will contract on drying and pure carbon, the particles of which are of colloidal dimensions, applying a plurality of thin coatings of this mixture to one surface of a zinc plate to form on said plate a carbonaceous layer adapted to constitute a cell electrode and allowing each of said coatings to dry prior to application of a further coating, such drying contracting the carrier to pack the colloidal carbon particles together.

2. A method of producing a carbon zinc element for use in the construction of a dry cell or battery, including the steps of first coating the surface of the zinc plate with a weak solution of carbon black and an adhesive spirit varnish, applying thereto a thin carbonaceous and liquid-proof layer, said layer including a colloidal dispersion of pure carbon in an ammonia-resisting adhesive carrier which will contract on drying, and allowing the carrier to dry and contract to provide good electrical contact between the particles of carbon throughout the carbonaceous layer and between said layer and the zinc plate.

3. A method of producing a carbon zinc element for use in the construction of a dry cell or battery, including the steps of first coating the surface of the zinc plate with a weak solution of carbon black and an adhesive spirit varnish, mixing in a colloid mill suitable quantities of pure carbon and ammonia-resisting adhesive carrier which will contract on drying, said mixing being continued until the particles of carbon become colloidally dispersed in the adhesive carrier, applying a coating of this mixture over said first coating on the zinc plate and allowing the carrier to dry and contract to provide good electrical contact between the particles of carbon throughout the carbonaceous layer and between said layer and the zinc plate.

4. A method of producing a carbon zinc element for use in the construction of a dry cell or battery including the steps of mixing in a colloid mill suitable quantities of pure carbon and ammonia-resisting adhesive carrier which will contract on drying, said mixing being continued until the carbon is colloidally dispersed in the carrier, applying to one surface of a zinc plate a plurality of thin coatings of this mixture to form on said plate a carbonaceous layer adapted to constitute a cell or electrode, said zinc plate being adapted to form one electrode of one cell electrode and the carbonaceous coating being adapted to form a further cell electrode and allowing each of said coatings to dry prior to application of a further coating, such drying contracting said carrier to pack the colloidal carbon particles together and provide good electrical contact between the particles of carbon throughout the carbonaceous layer and between said layer and the zinc plate.

FRANK MacCALLUM.